Oct. 21, 1952 E. G. O'FARRELL 2,614,757
APPARATUS FOR CONTINUOUSLY DELIVERING PLASTIC CEMENTITIOUS
MATERIAL TO A MOVING MOLDING SURFACE
Filed Sept. 3, 1948 2 SHEETS—SHEET 1
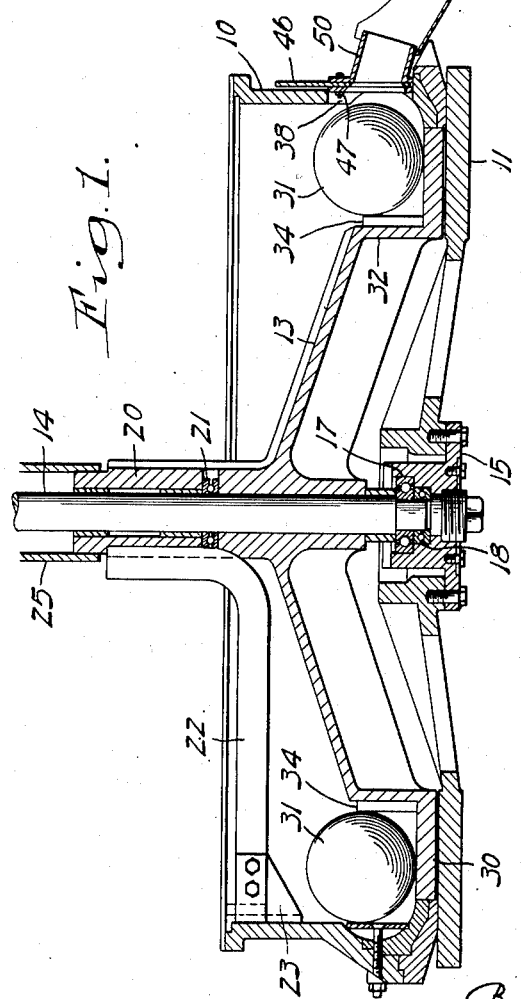
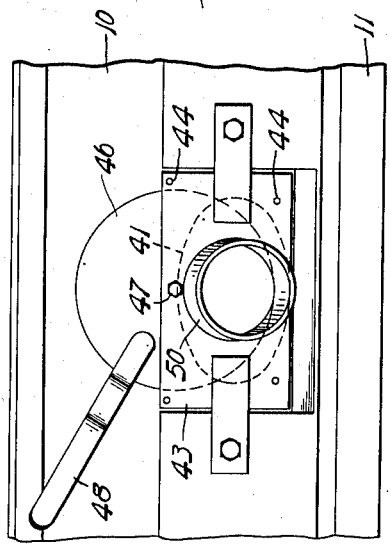
INVENTOR.
Elgin G. O'Farrell
BY
Bean, Brooks, Buckley & Bean.
Attorneys Oct. 21, 1952     E. G. O'FARRELL     2,614,757
APPARATUS FOR CONTINUOUSLY DELIVERING PLASTIC CEMENTITIOUS
MATERIAL TO A MOVING MOLDING SURFACE
Filed Sept. 3, 1948     2 SHEETS—SHEET 2
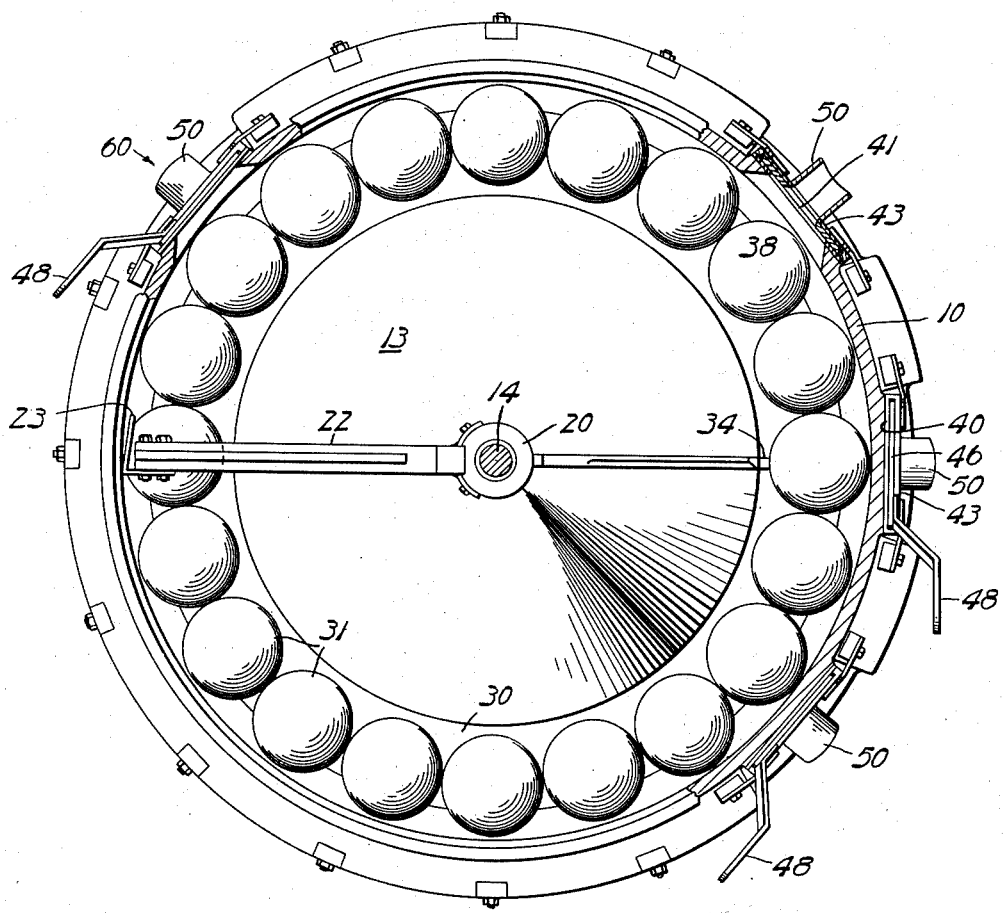
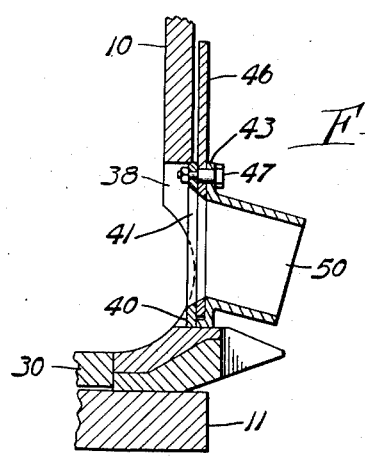
INVENTOR.
Elgin G. O'Farrell
BY
Bean, Brooks, Buckley & Bean.
Attorneys Patented Oct. 21, 1952

2,614,757

UNITED STATES PATENT OFFICE 2,614,757

APPARATUS FOR CONTINUOUSLY DELIVERING PLASTIC CEMENTITIOUS MATERIAL TO A MOVING MOLDING SURFACE

Elgin G. O'Farrell, Whittemore, Mich., assignor to National Gypsum Company, Buffalo, N. Y.

Application September 3, 1948, Serial No. 47,645

5 Claims. (Cl. 241—90)

This invention relates to apparatus for mixing cementitious materials and delivering the same to apparatus for further processing the mixed material.

In the manufacture of plasterboard, plaster lath and the like, a mixture of gypsum and water, with or without other ingredients such as paper pulp and the like, is conventionally dropped or poured upon a paper facing sheet which moves along upon a conveyor belt which is known in the art as a wallboard table. The deposited mixture then moves between a pair of master rolls where a second facing sheet is fed over the plastic mixture, and the whole then passes between caliper rolls which accurately size the paper faced gypsum slab as to thickness.

It is conventional, whatever the preliminary mixing procedure, to finally feed the ingredients of the mix in a more or less mixed state to a ball mixer which completes the mixing operation and discharges the mixed materials downwardly upon the lower facing sheet. The manner in which this material is thus discharged in conventional practices is such that a bothersome quantity of the material collects upon the lower part of the mixer in the region of the discharge opening, due to various factors, including splashing of the wet mixed material during discharge.

Numerous cleaning devices have been developed in attempts to avoid the forming of dried lumps at and around the discharge point, but none of the proposed expedients has been satisfactory. The ball mixer is conventionally located above the moving table of the board machine in such position that splashing from the discharging material causes lumps to form on splash pads located around the mixer gates. The splash pads are necessary to keep the mix on the facing paper sheet. The lumps which form on the splash pads have to be removed by scraping or chipping and in the process some of the lumps inevitably move along with the plastic mix and cause tearing of the paper facing sheets at the forming rolls. The big majority of paper tears are caused by these lumps forming under the mixer and around the splash pads.

Another serious objection to conventional mixer gates located at the bottom of the mixer is the hazard attending the removal of set gypsum from within and around the gates. This is usually done with a hooked bar and the hook frequently catches in the mixing parts and pulls the operator into the mixer, throws the bar against him, or twists his arm, the speed being such that the accident happens before he can drop the bar. The bottom gate arrangement creates a dirty and hazardous condition all around the mixer and, in fact, all along the board line because of paper tears caused by lumps forming under the gates. Further, the gates are usually so arranged and constructed that plastic mix sets up in the gate grooves and, if they are not moved for a short time, it is necessary to hammer them loose to change their position.

The present invention provides a ball mixing arrangement wherein the material emerges from the ball mixer in a novel manner and is conducted therefrom to a place where it is deposited upon the traveling lower facing sheet in such manner that this objectionable collection of hardened gypsum is substantially eliminated and the deposition of the wet mixture on the lower facing sheet is continuous and uniform. The use of the device in the present invention has been found to greatly reduce the necessity for interrupting operation of the mixer and its associated apparatus for cleaning the mixer and adjacent supporting parts and, when cleaning is required, it can be carried on with much greater facility and dispatch than heretofore. Further, according to the present invention, a mixing gate of improved construction is provided.

Various other objects and advantages are attendant upon the use of the apparatus of the present invention. It is to be understood that the form illustrated in the drawings and described in the following specification is by way of example only, and that the principles of the present invention are limited only as defined in the appended claims.

In the drawings:

Fig. 1 is a central cross-sectional view on a vertical plane through one form of the novel mixing device of the present invention;

Fig. 2 is a top plan view thereof;

Fig. 3 is a fragmentary elevational view taken approximately at right angles to Fig. 1; and Fig. 4 is a fragmentary cross-sectional view of one of the discharge openings of the mixing device.

Like characters of reference denote like parts throughout the several figures, and the numeral 10 designates a relatively shallow cylindrical shell which rests upon and is fixed to an annular base plate 11. Base plate 11 is supported by structural framework (not shown) which straddles the moving conveyor belt or wallboard table. The manner in which base plate 11 is rigidly supported is entirely conventional and need not be illustrated herein. The conventional mixer of the prior art is shown and described in Letters Patent to Turner et al., No. 1,813,828 and the support for base plate 11 may be as there shown.

A rotatable mixing element is designated 13 in Figs. 1 and 2 and is fixed to a drive shaft 14 in any desired manner. Drive shaft 14 has a reduced lower end portion which has antifriction bearing in a hub or bearing element 15 which is fixed concentrically to base plate 11. Shaft 14 seats in hub element 15 through the medium of a radial ball bearing 17 and an annular thrust ball bearing 18 and is driven from its upper end (not shown) in a manner well-known in the art and illustrated in the above-identified Letters Patent No. 1,813,828.

A sleeve 20 surrounds and has rotatable bearing on shaft 14 and rests at its lower end on an annular thrust ball bearing 21, which in turn rests upon the central hub portion of mixing element 13. Sleeve 20 supports a radiating scraping arm 22 which has at its outer end a scraper 23 which engages the inner peripheral wall of cylindrical shell 10 and at its upper edge moves along the lower side of a cover element for shell 10, the cover element being omitted in Figs. 1 and 2. A tubular element 25 is fixed to the periphery of sleeve 20 at the upper end of the latter and extends upwardly to rotatable drive means which rotate the scraping arm 22 at a considerably slower rate than the rate of rotation of mixing element 13. The manner in which the tubular element 25 is rotatably driven may also be the same as that illustrated in the above-mentioned Letters Patent.

The main body portion of mixing element 13 is of generally frusto-conical shape and includes a lower peripheral flange 30 which overlies base plate 11 and has resting thereon a circular series of balls 31. A generally vertical flange portion 32 of mixing element 13 disposed at the inner edge of flange 30 cooperates with flange 30 and the inner periphery of cylindrical shell 10 to form a raceway for balls 31. Abutments 34 fixed to flange portion 32 engage the balls 31 upon rotation of mixing element 13 and tend to rotate them.

In Fig. 1 the conveyor belt or wallboard table of the plaster lath or wallboard machine is indicated fragmentarily at 35 and a lower facing sheet for plasterboard or plaster lath is designated 36. Cylindrical shell 10 is provided near the bottom of its peripheral wall with discharge openings 38, in the present instance three in number. In Fig. 2 portions of cylindrical shell 10 are shown in cross-section, and the plane of the cross-section is irregular so that one of the three openings at the right of Fig. 2 is in cross-section, the upper one in Fig. 2, while in the case of the remaining two openings 38, the plane of the cross-section is above the openings.

Referring particularly to Figs. 3 and 4, the openings 38 in shell 10 may be of considerable extent but their effective areas are determined by fixed plates 40 which are fixed in the openings 38 and have elliptical or oval openings 41. A second plate element 43 is fixed against each plate 41 as by means of clamp blocks 44, see Fig. 3, and plate element 43 is provided with an arcuate recess which receives a generally circular valve or closure plate 46. Closure plate 46 is guided for rotative movement in the arcuate recesses in plate element 43 by means of a shoulder screw or bolt 47 and has an outwardly projecting manipulating handle 48.

A generally circular spout portion 50 projects from the outer face of plate element 43, extending slightly downwardly as shown in Fig. 4. Valve plate 46 is provided with a circular opening 52 which, in Figs. 3 and 4, are shown concentric with and in registry with the opening of spout portion 50, this being the fully-opened position of valve plate 46. By manipulation of handle 48 valve plate 46 may be moved to any desired position of adjustment from the fully-open position of Figs. 3 and 4 to a position where closure plate 46 entirely closes off the spout element 50. The elongated contour of opening 41 permits the balls 31 to move intermedially against the opening 52 of valve plate 46 regardless of the position of adjustment of the valve plate so that the balls prevent the accumulation of gypsum about the opening 52, even though a major portion thereof be out of registry with spout element 50.

Secured to the outer end of each spout element 50 in any desired manner is a channel or chute element 55 which is preferably somewhat flexible and may be of fabric-reinforced rubber, such as is found in conventional rubber hose. Each of the chutes 55 incline downwardly substantially to the surface of the facing paper sheet and, in fact, may rest lightly thereon. By virtue of this arrangement there is no need for critical adjustment of the position of the chute relative to the mixer or the facing sheet upon which the mix is deposited.

By reason of the foregoing discharge means the plastic mix moves through the valving mechanisms and downwardly along the chutes 55 to the moving facing sheet with no possibility of splashing or slopping about, and the point where the mix meets the paper is remote from and spaced substantially ahead of the mixing device proper.

A further discharge gate and valve control means therefor all of which are identical with the three working discharge outlets is indicated generally at 60 in Fig. 2. This discharge gate is used only for clean-out purposes. It is to be noted that valve plate 46 fully occupies the arcuate recess in outer plate 43 in all positions so that there is no possibility of plastic mix setting up in the recess and interfering with free operation.

What is claimed is:

1. Apparatus for continuously delivering plastic cementitious material and the like to a moving table for forming panels, said apparatus including a mixing device comprising a cylindrical mixing shell supported above the table, a plurality of peripheral openings in the lower part of said shell facing the direction of movement of said table, and inclined flexible conduit means leading from said openings downwardly and adapted to rest yieldably upon said table to discharge mixed material directly thereupon.

2. Apparatus for continuously delivering plastic cementitious material and the like to a moving table for forming panels, said apparatus including a mixing device comprising a cylindrical mixing shell supported above the table, a plurality of peripheral openings in the lower part of said shell facing the direction of movement of said table, and inclined flexible conduit means leading from said openings downwardly and forwardly and adapted to rest yieldably on said table to discharge mixed material directly thereupon.

3. Apparatus for continuously delivering plastic cementitious material and the like to a moving table for forming panels, said apparatus including a mixing device comprising a cylindrical mixing shell supported above the table, a plurality of peripheral openings in the lower part of said shell facing the direction of movement of said table, manually adjustable closure means associated with each of said openings for selectively adjusting the effective area thereof, and inclined flexible conduit means leading from said openings downwardly and forwardly and adapted to rest yieldably on said table to discharge mixed material directly thereupon.

4. Apparatus for continuously delivering plastic cementitious material and the like to a moving table for forming panels, said apparatus including a mixing device comprising a cylindrical mixing shell supported above the table, a plurality of peripheral openings in the lower part of said shell facing the direction of movement of said table, valve means for each of said openings, said valve means comprising a fixed element having an outlet opening and an arcuate recess, a circular valve plate in said recess and having an outlet opening movable into and out of registry relative to the opening in said fixed element to adjust the effective outlet area, and inclined conduit means leading from said openings downwardly and adapted to discharge mixed material upon said table.

5. Apparatus for continuously delivering plastic cementitious material and the like to a moving table for forming panels, said apparatus including a mixing device comprising a cylindrical mixing shell supported above the table, a plurality of peripheral openings in the lower part of said shell facing the direction of movement of said table, valve means for each of said openings, said valve means comprising a fixed element having an outlet opening and an arcuate recess, a valve plate having an arcuate portion, said valve plate having an outlet opening movable into and out of registry relative to the opening in the fixed element to adjust the outlet area, the arcuate portion of the valve plate being of sufficient peripheral extent to fully occupy said arcuate recess in all positions of adjustment, and inclined conduit means leading from said openings downwardly and adapted to discharge mixed material upon said table.

ELGIN G. O'FARRELL.

REFERENCES CITED

The following references are of record in the file of this patent:

UNITED STATES PATENTS

| Number | Name | Date |
|---|---|---|
| 779,164 | Jamison | Jan. 3, 1905 |
| 907,625 | Midgley | Dec. 22, 1908 |
| 1,230,820 | Levalley et al. | June 19, 1917 |
| 1,268,219 | Cooley | June 4, 1918 |
| 1,607,827 | Herrmann | Nov. 23, 1926 |
| 1,702,729 | Hite | Feb. 19, 1929 |
| 1,813,828 | Turner et al. | July 7, 1931 |
| 1,908,658 | Dean | May 9, 1933 |

FOREIGN PATENTS

| Number | Country | Date |
|---|---|---|
| 12,863 | Great Britain | 1914 |